(12) United States Patent
Kim et al.

(10) Patent No.: US 11,996,950 B2
(45) Date of Patent: May 28, 2024

(54) GROUP-BASED SIGNALING FOR A WIRELESS COMMUNICATION SYSTEM

(71) Applicant: QUALCOMM Incorporated, San Diego, CA (US)

(72) Inventors: Yuchul Kim, San Diego, CA (US); Hwan Joon Kwon, San Diego, CA (US); Krishna Kiran Mukkavilli, San Diego, CA (US); Huilin Xu, Temecula, CA (US); Jay Kumar Sundararajan, San Diego, CA (US); Yeliz Tokgoz, San Diego, CA (US); Jing Lei, San Diego, CA (US); Peter Pui Lok Ang, San Diego, CA (US); Tingfang Ji, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 17/445,166

(22) Filed: Aug. 16, 2021

(65) Prior Publication Data

US 2022/0052861 A1 Feb. 17, 2022

Related U.S. Application Data

(60) Provisional application No. 63/066,671, filed on Aug. 17, 2020.

(51) Int. Cl.
| | |
|---|---|
| *H04L 12/18* | (2006.01) |
| *H04W 4/08* | (2009.01) |
| *H04W 52/06* | (2009.01) |

(52) U.S. Cl.
CPC ........ *H04L 12/185* (2013.01); *H04L 12/1868* (2013.01); *H04W 4/08* (2013.01); *H04W 52/06* (2013.01)

(58) Field of Classification Search
CPC .... H04L 12/185; H04L 12/1868; H04W 4/08; H04W 52/06
See application file for complete search history.

(56) References Cited

U.S. PATENT DOCUMENTS

| | | | | |
|---|---|---|---|---|
| 7,969,987 B1 * | 6/2011 | Hansen | ............... | H04L 43/0894 370/468 |
| 2010/0002612 A1 * | 1/2010 | Hsu | ................... | H04W 52/0232 370/352 |

(Continued)

FOREIGN PATENT DOCUMENTS

WO WO-2020013623 A1 1/2020

OTHER PUBLICATIONS

CMCC: "Discussion on UE Power Saving Schemes with Adaption to UE Traffic", 3GPP TSG RAN WG1 #96, 3GPP Draft, R1-1903344, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 22, 2019 (Feb. 22, 2019), 14 Pages, XP051601021, Retrieved from the Internet: URL: http://www.3gpp.org/ftp/tsg%5Fran/WG1%5FRL1/TSGR1%5F96/Docs/R1%2D1903344%2Ezip [retrieved on Feb. 22, 2019].

(Continued)

*Primary Examiner* — Chris Parry
*Assistant Examiner* — Steven C Nguyen
(74) *Attorney, Agent, or Firm* — Norton Rose Fulbright US LLP

(57) ABSTRACT

A method of wireless communication includes receiving, by a network device from a server, first data associated with an application. The method further includes, during a first monitoring occasion associated with the application, transmitting, by the network device, the first data to a first group of multiple user equipment (UE) devices that execute the application. The method further includes transmitting a (Continued)

message to the first group after transmitting the first data. The message indicates completion of the first monitoring occasion.

29 Claims, 7 Drawing Sheets

(56) References Cited

U.S. PATENT DOCUMENTS

| | | | | |
|---|---|---|---|---|
| 2017/0195957 | A1* | 7/2017 | Debates | H04W 52/0254 |
| 2018/0219606 | A1* | 8/2018 | Ng | H04L 5/0053 |
| 2019/0045536 | A1* | 2/2019 | Gao | H04L 5/0053 |
| 2019/0104510 | A1* | 4/2019 | Lee | H04W 72/12 |
| 2020/0021633 | A1* | 1/2020 | Sengoku | G06F 13/4291 |
| 2020/0137673 | A1* | 4/2020 | Shikari | H04W 76/27 |
| 2020/0154295 | A1* | 5/2020 | Lin | H04W 24/08 |
| 2020/0351890 | A1* | 11/2020 | Tsai | H04W 48/12 |
| 2021/0022174 | A1* | 1/2021 | Park | H04W 72/21 |
| 2021/0043059 | A1* | 2/2021 | Chen | G08B 29/04 |
| 2021/0136689 | A1* | 5/2021 | Kim | H04W 24/08 |
| 2022/0201516 | A1* | 6/2022 | Guo | H04W 72/0446 |

OTHER PUBLICATIONS

International Search Report and Written Opinion—PCT/US2021/071202—ISA/EPO—Nov. 18, 2021.

* cited by examiner

GROUP-BASED SIGNALING FOR A WIRELESS COMMUNICATION SYSTEM

CROSS-REFERENCE TO RELATED APPLICATIONS

This application claims the benefit of and priority to U.S. Prov. Pat. App. No. 63/066,671, entitled "GROUP-BASED SIGNALING FOR A WIRELESS COMMUNICATION SYSTEM" and filed on Aug. 17, 2020, the disclosure of which is hereby incorporated by reference herein in its entirety as if fully set forth below and for all applicable purposes.

TECHNICAL FIELD

Aspects of the present disclosure relate generally to wireless communication systems, and more particularly, to group-based signaling for a wireless communication system.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In some aspects of the disclosure, an apparatus for wireless communication includes a transmitter and a receiver. The receiver is configured to receive, during a first monitoring occasion associated with an application and during operation based on a first mode, first data associated with the application from a network device. The receiver is further configured to receive, from the network device, a message indicating completion of the first monitoring occasion. The message is associated with a first transition from operation based on the first mode to a second mode. The receiver is further configured to receive, based on a second monitoring occasion associated with the application and after a second transition from operation based on the second mode to the first mode, second data associated with the application from the network device.

In some other aspects, an apparatus for wireless communication includes a transmitter and a receiver. The transmitter is configured to transmit, during a first monitoring occasion associated with an application, first data associated with the application to a first group of multiple user equipment (UE) devices that execute the application. The first data is received from a server associated with the application. The transmitter is further configured to transmit, to the first group after transmitting the first data, a message indicating completion of the first monitoring occasion.

In some other aspects, a method of wireless communication includes receiving, by a network device from a server, first data associated with an application. The method further includes, during a first monitoring occasion associated with the application, transmitting, by the network device, the first data to a first group of multiple user equipment (UE) devices that execute the application. The method further includes transmitting a message to the first group after transmitting the first data. The message indicates completion of the first monitoring occasion.

In some other aspects, a non-transitory computer-readable medium stores instructions executable by a processor to perform operations. The operations include receiving, by a network device from a server, first data associated with an application. The operations further include, during a first monitoring occasion associated with the application, transmitting, by the network device, the first data to a first group of multiple UE devices that execute the application. The operations further include transmitting a message the first group after transmitting the first data. The message indicates completion of the first monitoring occasion.

In some other aspects, an apparatus includes a memory and one or more processors coupled to the memory. The one or more processors are configured to receive, from a server, first data associated with an application. The one or more processors are further configured to transmit, during a first monitoring occasion associated with the application, the first data to a first group of multiple UE devices that execute the application. The one or more processors are further configured to transmit a message to the first group after transmitting the first data. The message indicates completion of the first monitoring occasion.

In some other aspects, an apparatus includes means for receiving, from a server, first data associated with an application. The apparatus further includes means for transmitting, during a first monitoring occasion associated with the application, the first data to a first group of multiple UE devices that execute the application and for transmitting a message to the first group after transmitting the first data. The message indicates completion of the first monitoring occasion.

In some other aspects, a method of wireless communication includes executing an application by a UE. The method further includes, during a first monitoring occasion associated with the application and during operation by the UE based on a first mode, receiving first data associated with the application from a network device. The method further includes receiving a message by the UE from the network device. The message indicates completion of the first monitoring occasion. The method further includes transitioning, based on the message, from operation based on the first mode to a second mode and transitioning, based on a second monitoring occasion associated with the application, from operation based on the second mode to the first mode to receive second data associated with the application from the network device.

In some other aspects, a non-transitory computer-readable medium stores instructions executable by a processor to perform operations. The operations include executing an application by a UE. The operations further include, during a first monitoring occasion associated with the application and during operation by the UE based on a first mode, receiving first data associated with the application from a network device. The operations further include receiving a message by the UE from the network device. The message indicates completion of the first monitoring occasion. The operations further include transitioning, based on the message, from operation based on the first mode to a second mode and transitioning, based on a second monitoring occasion associated with the application, from operation based on the second mode to the first mode to receive second data associated with the application from the network device.

In some other aspects, an apparatus includes a memory and one or more processors coupled to the memory. The one or more processors are configured to execute an application and to receive, during a first monitoring occasion associated with the application and during operation based on a first mode, first data associated with the application from a network device. The one or more processors are further configured to receive a message from the network device. The message indicates completion of the first monitoring occasion. The one or more processors are further configured to transition, based on the message, from operation based on the first mode to a second mode and to transition, based on a second monitoring occasion associated with the application, from operation based on the second mode to the first mode to receive second data associated with the application from the network device.

In some other aspects, an apparatus includes means for executing an application. The apparatus further includes means for receiving, during a first monitoring occasion associated with the application and during operation based on a first mode, first data associated with the application from a network device and for receiving a message from the network device. The message indicates completion of the first monitoring occasion. The apparatus further includes means for transitioning, based on the message, from operation based on the first mode to a second mode and for transitioning, based on a second monitoring occasion associated with the application, from operation based on the second mode to the first mode to receive second data associated with the application from the network device.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
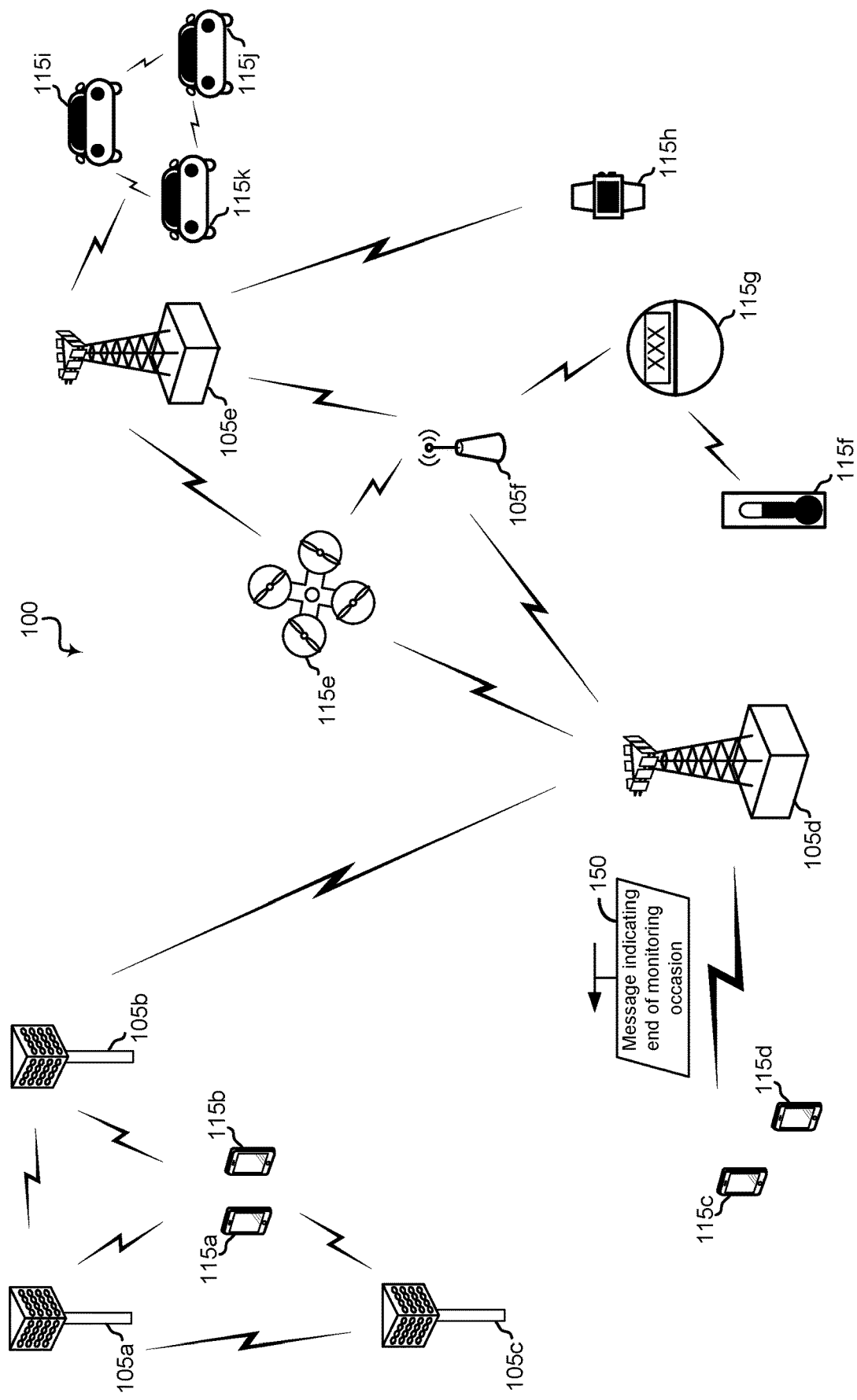
FIG. 1 is a block diagram illustrating an example of a wireless communication system according to some aspects of the disclosure.

Wireless communication systems increasingly provide a wide variety of features. As the amount of features provided by wireless communication devices increases, battery efficiency may be more important for wireless communication devices. As an example, certain programs and applications executed by a wireless communication device may be computationally intensive (e.g., involving a relatively large number of processing cycles or the use of a relatively large number of hardware components) or may involve transmission or reception of a relatively large amount of data. As a result, some wireless communication devices may need to be recharged frequently, which may be inconvenient.

A wireless communication system in accordance with some aspects of the disclosure uses a frame generation periodicity associated with certain applications as an opportunity for power savings by one or more wireless communication devices (e.g., a user equipment (UE) device), by one or more network devices (e.g., a base station), or both. For example, in some implementations, an extended reality (XR) program executed by a UE may specify that data is transmitted by an XR server to the base station (and from the base station to the UE) based on a frame periodicity, such as a 60 hertz (Hz) frame rate or a 120 Hz frame rate. In this example, frame bursts associated with the XR program may occur 60 times per second (or every 16.67 milliseconds (ms)) or 120 times per second (or every 8.33 ms). Each frame burst may be referred to as a monitoring occasion for the UE.

After transmitting data associated with the XR program during one monitoring occasion, the base station may transmit a message indicating completion of the monitoring occasion. The message may enable the UE to operate according to a low-power mode until the subsequent monitoring occasion. The message may include downlink control information (DCI) transmitted via a physical downlink control channel (PDCCH). The message may be referred to as a discontinuous PDCCH monitoring (DPM) signal.

In some examples, the base station may assign multiple UEs to a common DPM group, and UEs of the common DPM group may share a DPM signal (also referred to herein as group-based DPM) signaling). For example, if UEs share similar traffic offsets (where frame bursts for the UEs occur relatively close to one another), then the base station may assign the UEs to a common DPM group. Alternatively or in addition, the base station may assign the UEs to a common DPM group based on the UEs being located within a common physical location (and sharing a common beam direction). In this case, the base station may use a common beam direction to transmit the message to the UEs.

Group-based DPM signaling in accordance with some aspects of the disclosure may reduce power consumption in a wireless communication system. For example, between frame bursts associated with the XR program, one or more UEs may operate according to a low power state. Alternatively or in addition, the base station may operate according to a low power state between frame bursts associated with the XR program. Further, signaling overhead may be reduced by assigning multiple UEs to a common DPM group that receives a common DPM signal, thus reducing power consumption and network traffic. As a result, power consumption may be reduced for some wireless communication devices.

Generally, in deployments, aspects can be associated with one or more applications. Applications may be reality or other real-time based software or other utilities running on a UE (e.g., messaging, gaming, real-time communication, collaborative communication, coordinated communication, etc.). In some instances, associations may be made to the same or different instances of the same application or utility or associations may be diverse across a plurality of applications. In some instances, alternatively or additionally, one or applications may also involve communication scenarios where communication devices (e.g., UE and/or base station) may employ discontinuous transmission protocols (e.g., discontinuation reception (DRX)).

To further illustrate, the disclosure relates generally to wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km^2), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. One or more features described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105$d$ and 105$e$ are regular macro base stations, while base stations 105$a$-105$c$ are macro base stations enabled with one of 3 dimension (3D), full dimension (FD), or massive MIMO. Base stations 105$a$-105$c$ take advantage of their higher dimension MIMO capabilities to exploit 3D beamforming in both elevation and azimuth beamforming to increase coverage and capacity. Base station 105$f$ is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115$a$-115$d$ of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115$e$-115$k$ illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105$a$-105$c$ serve UEs 115$a$ and 115$b$ using 3D beamforming and coordinated spatial techniques, such as coordinated multi-point (CoMP) or multi-connectivity. Macro base station 105$d$ performs backhaul communications with base stations 105$a$-105$c$, as well as small cell, base station 105$f$. Macro base station 105$d$ also transmits multicast services which are subscribed to and received by UEs 115$c$ and 115$d$. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such as UE 115$e$, which is a drone. Redundant communication links with UE 115$e$ include from macro base stations 105$d$ and 105$e$, as well as small cell base station 105$f$. Other machine type devices, such as UE 115$f$ (thermometer), UE 115$g$ (smart meter), and UE 115$h$ (wearable device) may communicate through wireless network 100 either directly with base stations, such as small cell base station 105$f$, and macro base station 105$e$, or in multi-hop configurations by communicating with another user device which relays its information to the network, such as UE 115$f$ communicating temperature measurement information to the smart meter, UE 115$g$, which is then reported to the network through small cell base station 105$f$. Wireless network 100 may also provide additional network efficiency through dynamic, low-latency TDD/FDD communications, such as in a vehicle-to-vehicle (V2V) mesh network between UEs 115i-115k communicating with macro base station 105e.

In some aspects, a base station 105 may transmit a message 150 to one or more UEs 115 to indicate the end of a monitoring occasion to the one or more UEs 115. To illustrate, in some examples, the base station 105d may transmit the message 150 to the UEs 115c and 115d to indicate the end of a monitoring occasion to the UEs 115c and 115d. In some other examples, one or more other base stations 105 may transmit the message 150 to one or more other UEs 115.

Figure 2:
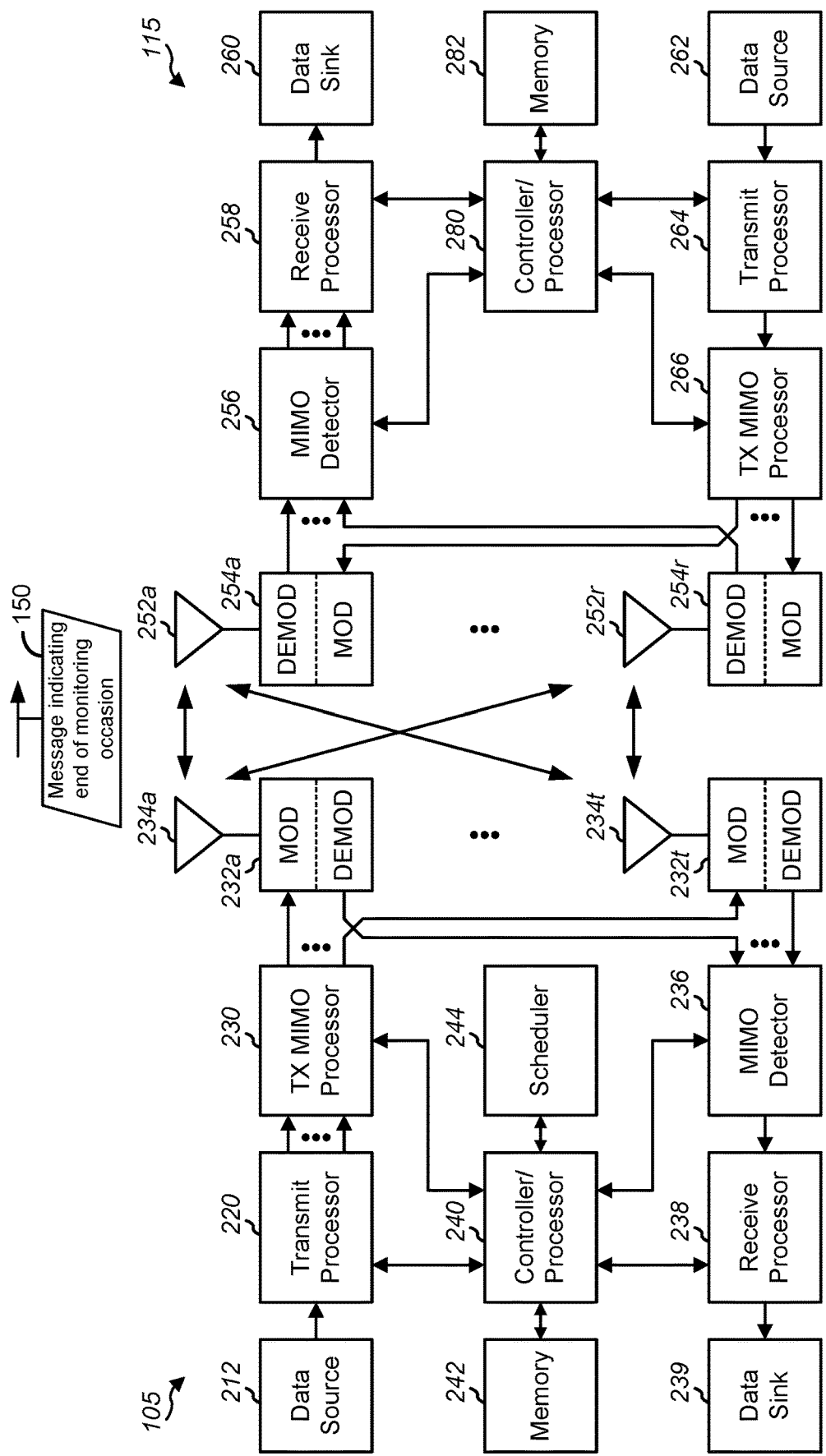
FIG. 2 is a block diagram illustrating examples of a base station and a UE according to some aspects of the disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 5 and 6 and/or other processes for the techniques described herein. To further illustrate, controller/processor 240 may initiate or control transmission of the message 150 to the UE 115 to indicate the end of a monitoring occasion, and controller/processor 280 may control reception of the message 150. Controller/processor 280 may detect the end of the monitoring occasion based on the message 150. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
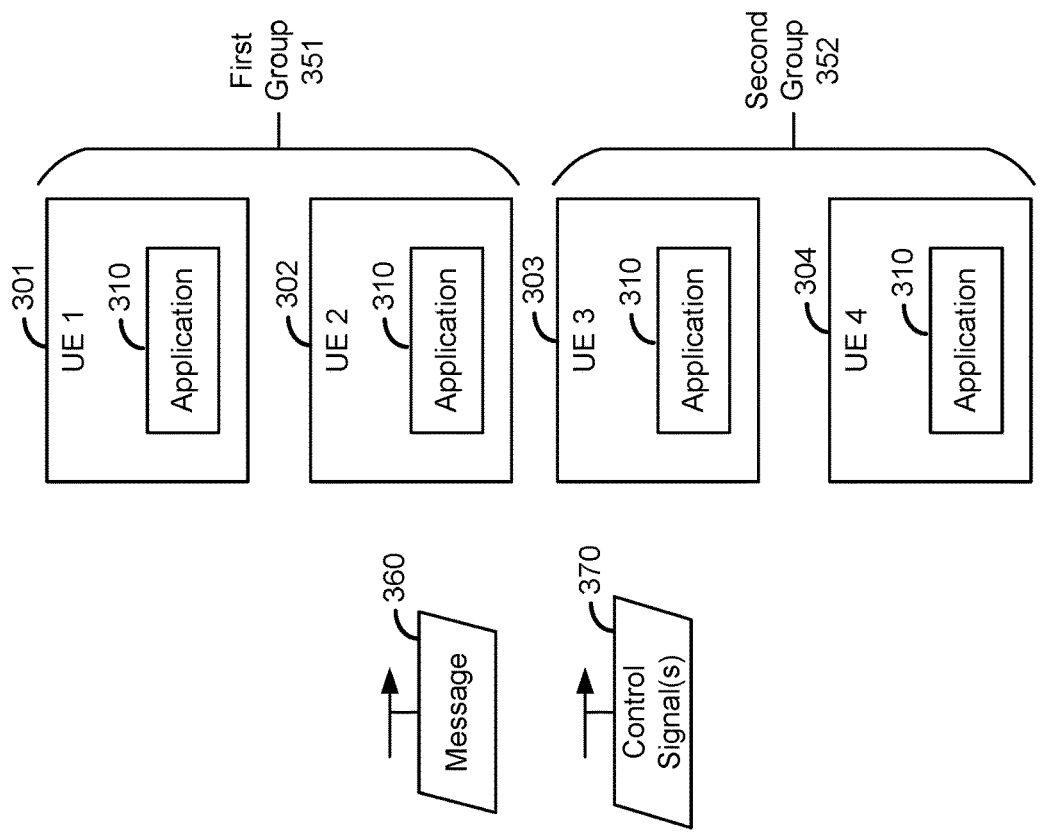
FIG. 3 is a block diagram illustrating an example of a wireless communication system according to some aspects of the disclosure.
Figure 3:
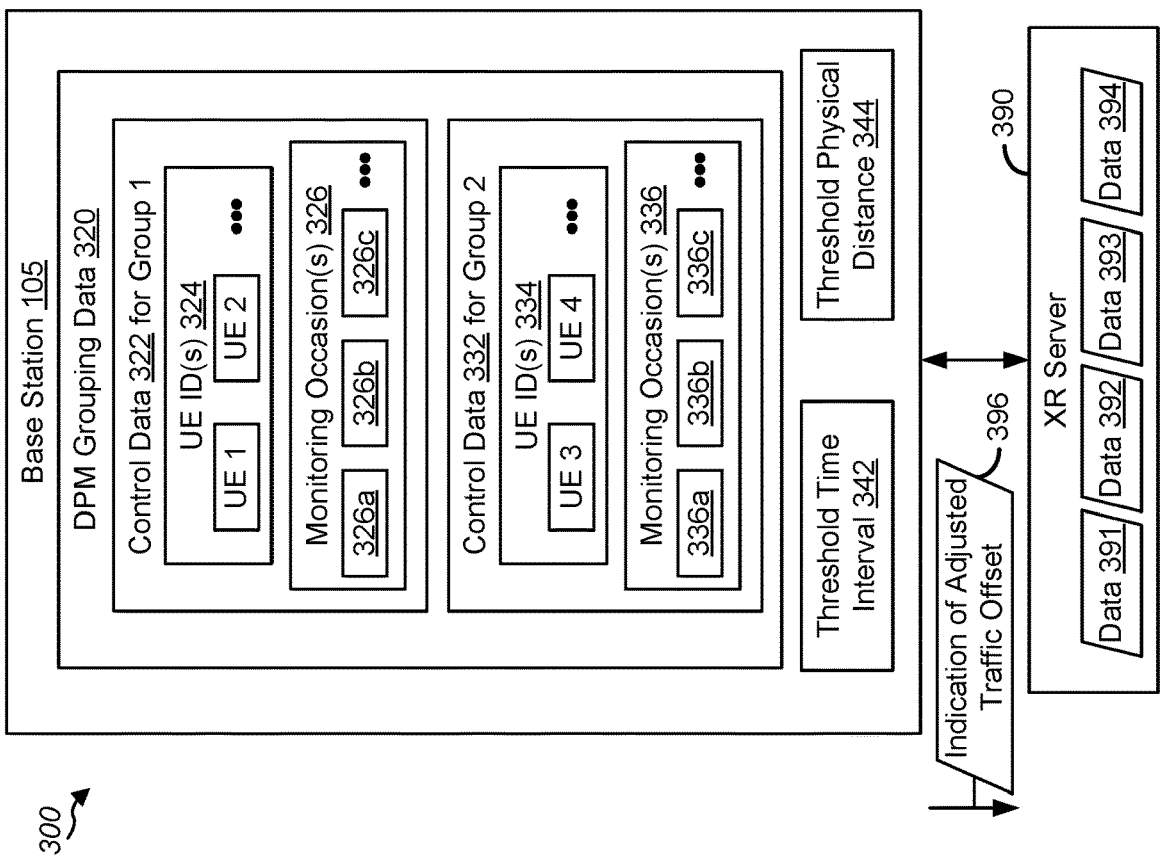

FIG. 3 is a block diagram illustrating an example of a wireless communication system 300 according to some aspects of the disclosure. The wireless communication system 300 may include one or more base stations, such as the base station 105. The wireless communication system 300 may further include one or more UEs, such as UEs 301, 302, 303, and 304. One or more of the UEs 301, 302, 303, and 304 may correspond to any of the UEs 115 described with reference to FIGS. 1 and 2. The wireless communication system 300 may further include one or more servers, such as an extended reality (XR) server 390.

During operation, the UEs 301, 302, 303, and 304 may communicate with the base station 105. In one example, the UEs 301-304 each execute an application 310 and may send data to the base station 105 in connection with execution of the application 310, receive data from the base station 105 in connection execution of the application 310, or both. In some examples, the application 310 includes or corresponds to an XR program.

The base station 105 may receive data from a server (such as data 391, 392, 393, and 394 from the XR server 390) and may provide the data to any of the UEs 301-304. In some examples, the data 391-394 is used by one or more of the UEs 301-304 during execution of the application 310. For example, the data 391-394 may include frames used by the application 310 to present an XR environment, which may include XR graphics content presented at a display device, XR audio content presented at an audio device, haptic content, other convent, or a combination thereof. In some examples, the XR server 390 may generate any of the data 391-394 based on user input transmitted by one or more of the UEs 301-304. The user input may be transmitted to the XR server 390 via the base station 105.

In some aspects of the disclosure, the base station 105 determines discontinuous physical downlink control channel monitoring (DPM) grouping data 320 associated with the UEs 301-304. For example, the DPM grouping data 320 may include control data 322 associated with a first group 351 ("Group 1") of the UEs 301-304 and may include control data 332 associated with a second group 352 ("Group 2") of the UEs 301-304. In the example of FIG. 3, the control data 322 include one or more UE identifiers (IDs) 324 indicating one or more UEs associated with the first group 351, such as the UE 301 ("UE 1") and the UE 302 ("UE 2"). The control data 322 may also indicate one or more monitoring occasions 326 associated with the first group 351, such as monitoring occasions 326a, 326b, and 326c. The control data 332 may include one or more UE IDs 334 indicating one or more UEs associated with the second group 352, such as the UE 303 ("UE 3") and the UE 304 ("UE 4"). The control data 332 may also indicate one or more monitoring occasions 336 associated with the second group 352, such as monitoring occasions 336a, 336b, and 336c. In some examples, the base station 105 determines one or more parameters of the DPM grouping data 320 based on one or both of a threshold time interval 342 or a threshold physical distance 344, as described further below.

The base station 105 may transmit the data 391-394 to the UEs 301-304 based on the DPM grouping data 320. For example, the base station 105 may transmit the data 391-392 to the UEs 301-302 during a common monitoring occasion associated with the first group 351, such as the monitoring occasion 326a, based on the control data 322 indicating that the UEs 301-302 are associated with the first group 351. As another example, the base station 105 may transmit the data 393-394 to the UEs 303-304 during a common monitoring occasion associated with the second group 352, such as the monitoring occasion 336a, based on the control data 332 indicating that the UEs 303-304 are associated with the second group 352.

After completing transmission of data to a group for a particular monitoring occasion, the base station 105 may transmit a message 360 (e.g., the message 150 or another message) indicating completion of the monitoring occasion. For example, after completing transmission of the data 391-392 during the monitoring occasion 326a, the base station 105 may transmit the message 360 to the UEs 301-302 of the first group 351 to indicate the end of the monitoring occasion 326a. In some examples, in response to receiving the message 360, the UEs 301-302 may sleep or operate based on a lower-power state until the monitoring occasion 326b. Based on the monitoring occasion 326b, the UEs 301-302 may wake or transition to a higher-power state to monitor for other data transmitted by the base station 105 during the monitoring occasion 326b. As another example, after completing transmission of the data 393-394 during the monitoring occasion 336a, the base station 105 may transmit the message 360 to the UEs 303-304 of the second group 352 to indicate the end of the monitoring occasion 336a. In response to receiving the message 360, the UEs 303-304 may sleep or operate based on a lower-power state until the monitoring occasion 336b. Based on the monitoring occasion 336b, the UEs 303-304 may wake or transition to a higher-power state to monitor for other data transmitted by the base station 105 during the monitoring occasion 336b.

Alternatively or additionally, in some instances, indication of completion of a monitoring occasion may indicate or signal when completion will occur, that completion is occurring, or both. To illustrate, in some implementations, the message 360 may indicate one or more particular time slots when completion will occur. The one or more particular time slots may occur during or after reception of the message 360 by a UE 115. Accordingly, the message 360 may indicate when completion will occur, that completion is occurring, or that completion has occurred.

In some examples, the message 360 corresponds to a downlink control information (DCI) message sent via a physical downlink control channel (PDCCH). The message 360 may include an address field specifying a particular group associated with the message 360. For example, the address field may indicate a first address to specify the first group 351 or a second address to specify the second group 352.

Figure 4:
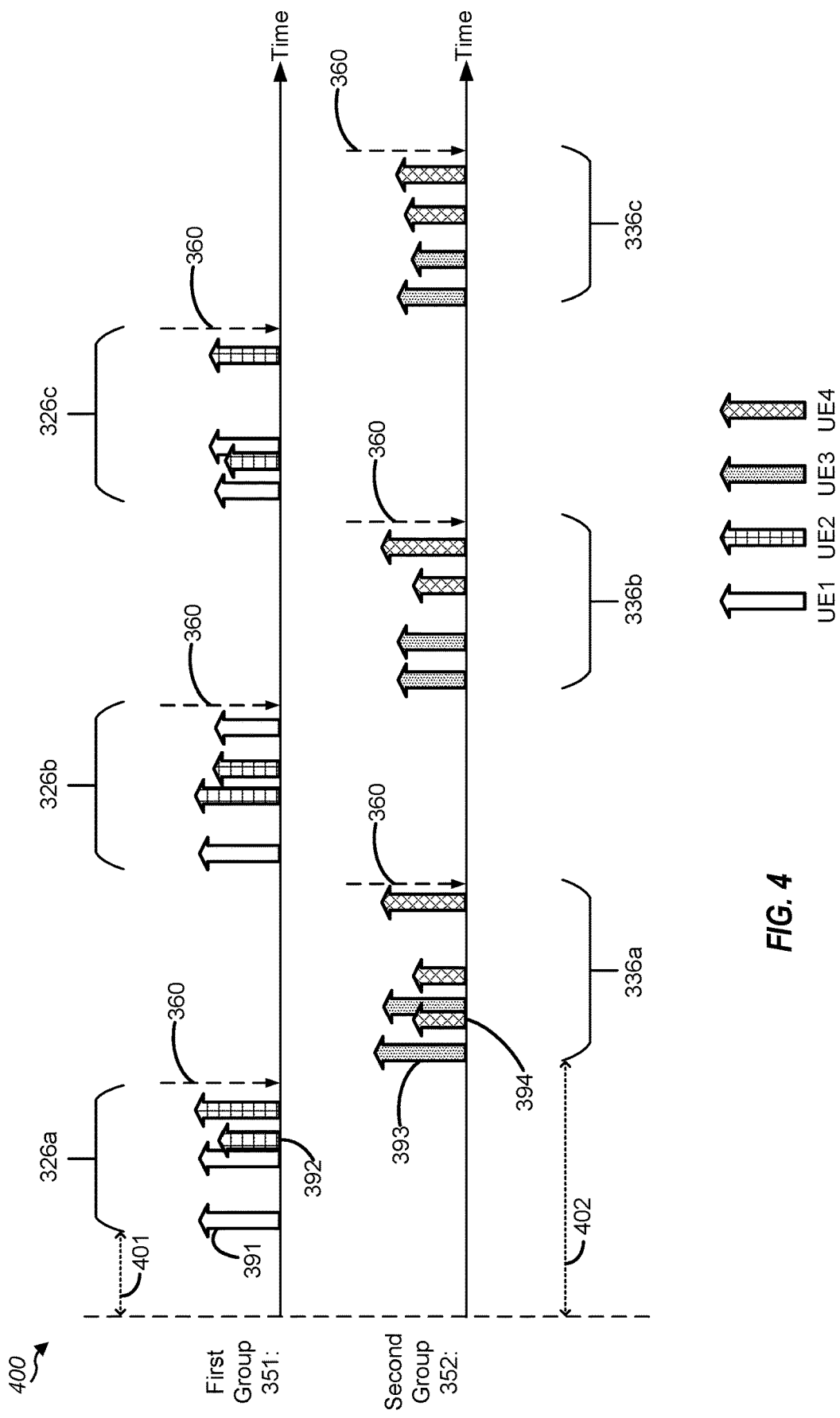
FIG. 4 is a timing diagram illustrating examples of operations according to some aspects of the disclosure.

To further illustrate, FIG. 4 is a timing diagram illustrating examples of operations 400 according to some aspects of the disclosure. The example of FIG. 4 illustrates that the base station 105 may transmit, during the monitoring occasion 326a, the data 391 to the UE 301 and the data 392 to the UE 302. After transmitting the data 391-392, the base station 105 may transmit, to the UEs 301-302, the message 360 to indicate completion of the monitoring occasion 326a. The operations 400 illustrate that the UEs 301-302 may operate based on a low power state after receiving the message 360 and until the monitoring occasion 326b. The operations 400 also illustrate that the base station 105 may transmit, during the monitoring occasion 336a, the data 393 to the UE 303 and the data 394 to the UE 304. After transmitting the data 393-394, the base station 105 may transmit, to the UEs 303-304, the message 360 to indicate completion of the monitoring occasion 336a. The UEs 303-304 may operate based on a low power state after receiving the message 360 and until the monitoring occasion 336b.

To further illustrate, in some examples, vertical axes in FIG. 4 for the first group 351 and the second group 352 correspond to UE power consumption. In some examples, UEs of the first group 351 operate based on a first mode associated with a first power consumption during the monitoring occasion 326a and operate based on a second mode associated with a second power consumption after the monitoring occasion 326a and prior to the monitoring occasion 326b. In this case, the second power consumption may be less than the first power consumption.

In some examples, a UE determines a start time of a monitoring occasion based on a frame periodicity associated with the application 310. For example, the application 310 may be associated with a frame periodicity corresponding to 60 hertz (Hz) or 120 Hz, as illustrative examples. In this case, a start time of the monitoring occasion 326b may occur 16.67 milliseconds (ms) or 8.33 ms after a start time of the monitoring occasion 326a, as an illustrative example. A UE may transmission from the second mode to the first mode based on the start time of a monitoring occasion.

Alternatively or in addition, the base station 105 may transition modes for power saving. To illustrate, the base station 105 may operate based on a first mode associated with a first power consumption during the monitoring occasion 326a and may operate based on a second mode associated with a second power consumption after the monitoring occasion 326a and prior to the monitoring occasion 326b. In this case, the second power consumption may be less than the first power consumption.

FIG. 4 also illustrates that the monitoring occasions 326a-c associated with the first group 351 may be offset from the monitoring occasions 336a-c associated with the second group 352. For example, a first group traffic offset 401 associated with the first group 351 may be different than (e.g., less than) a second group traffic offset 402 associated with the second group 352. As a result, data transmissions to the first group 351 may be time-multiplexed with respect to data transmissions to the second group 352.

In some examples, the base station 105 adjusts one or more traffic offsets associated with one or more UEs to determine a group traffic offset, such as the first group traffic offset 401 or the second group traffic offset 402. To illustrate, the base station 105 may adjust one or more parameters specified by the XR server 390, such as by "customizing" one or more traffic offsets associated with one or more UEs.

To further illustrate, the XR server 390 may specify a first traffic offset associated with the UE 301, a second traffic offset associated with the UE 302, a third traffic offset associated with the UE 303, and a fourth traffic offset associated with the UE 304, and the base station 105 may adjust one or more of the traffic offsets in connection with determining the groups 351, 352. In one example, the base station 105 identifies the first group 351 based on a difference between traffic offsets associated with the first group 351 being less than the threshold time interval 342. For example, if a difference between the first traffic offset and the second traffic offset is less than the threshold time interval 342, the base station 105 may group the UEs 301-302 into the first group 351. The base station 105 may group the UEs 303-304 into the second group 352 based on a difference between the third traffic offset and the fourth traffic offset being less than the threshold time interval 342. In some examples, the base station 105 adjusts a traffic offset associated with at least one UE of the first group 351 to be within monitoring occasions associated with the first group 351. For example, the base station 105 may adjust the second traffic offset while the first traffic offset remains fixed (or vice versa). In some examples, the base station 105 may adjust the second traffic offset while the third traffic offset remains fixed (or vice versa).

Alternatively or in addition, the base station 105 may identify a group based on beam directions associated with UEs. For example, the base station 105 may identify the first group 351 based on the UEs 301-302 being within the threshold physical distance 344 of one another. In this case, the base station 105 may use a common beam direction (e.g., a first beam direction) for the UEs 301-302. As another example, the base station 105 may identify the second group 352 based on the UEs 303-304 being within the threshold physical distance 344 of one another. In this case, the base station 105 may use a common beam direction (e.g., a second beam direction different than the first beam direction) for the UEs 303-304. Accordingly, the base station 105 may transmit the data 391-392 using the first beam direction and may transmit the data 393-394 using the second beam direction.

In an illustrative example, the base station 105 may determine UE grouping based on beam direction (and physical distance) of UEs and may then may adjust traffic offsets associated with UEs. For example, after selecting the first group 351 based on the threshold physical distance 344, the base station may adjust a traffic offset associated with at least one UE of the first group 351 to be within monitoring occasions associated with the first group 351. As another example, after selecting the second group 352 based on the threshold physical distance 344, the base station may adjust a traffic offset associated with at least one UE of the second group 352 to be within monitoring occasions associated with the second group 352. As a result, by determining a DPM grouping based on physical locations of UEs and then adjusting traffic offsets based on the determined DPM grouping, a group may have both a common beam direction and a common traffic offset.

Referring again to FIG. 3, the base station 105 may transmit, to the XR server 390, an indication 396 of an adjusted traffic offset. For example, if the base station 105 adjusts one or more of traffic offsets of the UEs 301-304, the base station 105 may notify the XR server 390 of the adjustment to enable the XR server 390 to operate based on the adjusted traffic offset.

In some examples, the base station 105 selects a monitoring occasion based on one or more control signals 370 transmitted by the base station 105. In some examples, the one or more control signals 370 include a synchronization signal block (SSB), a channel state information reference signal (CSI-RS), a tracking reference signal (TRS), or another signal transmitted periodically or semi-statically by the base station 105. In one example, overlap between the message 360 and the one or more control signals 370 is allowed. In this case, transmission of at least a portion of the one or more control signals 370 may occur during any of the monitoring occasions 326, 336. In some other examples, overlap between the message 360 and the one or more control signals 370 may be disallowed. In this case, the base station 105 may select any of the monitoring occasions 326, 336 to avoid overlap of transmission of the one or more control signals within the monitoring occasions 326, 336.

Figures 5, 6:
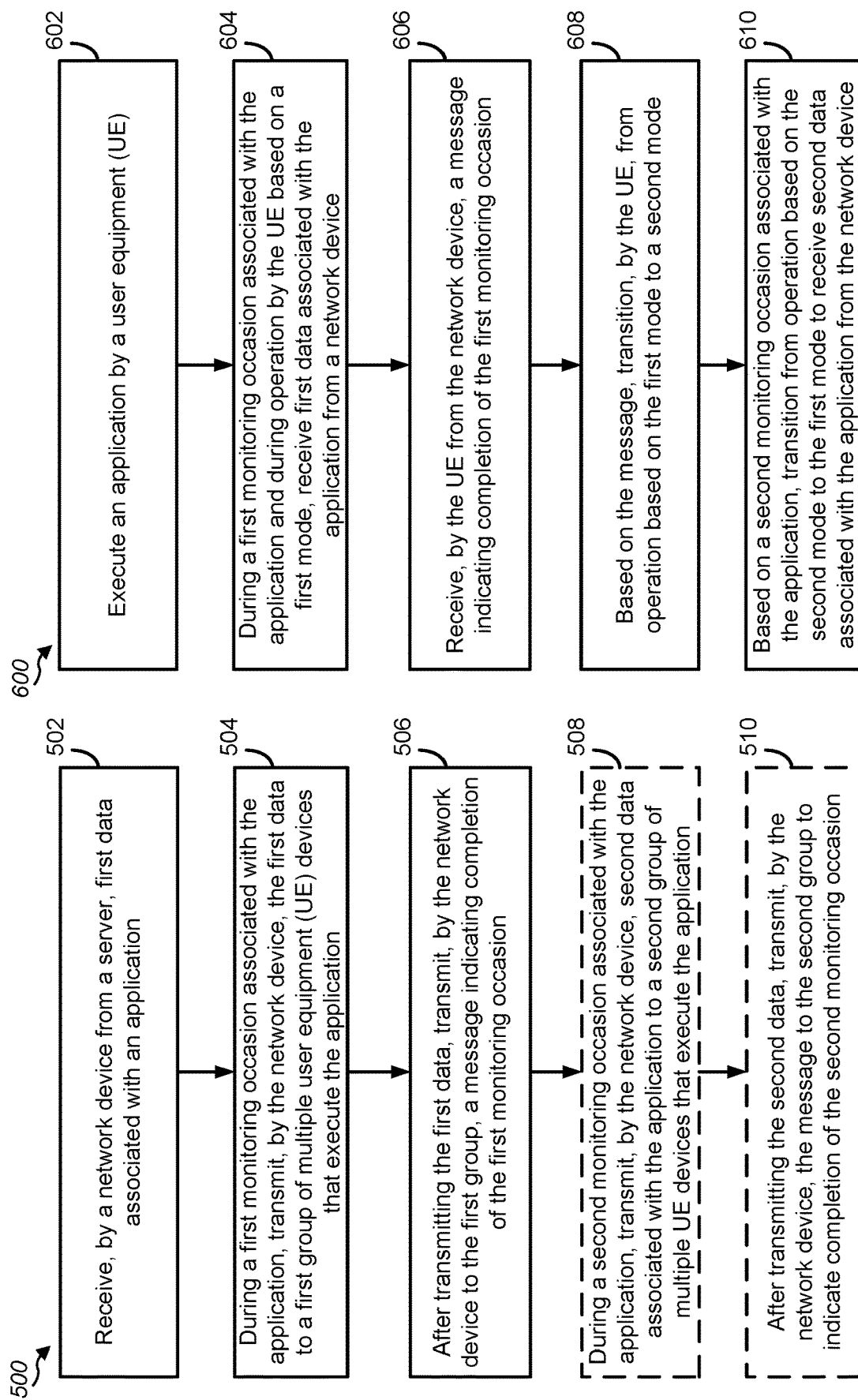
FIG. 5 is a flow chart of a method of wireless communication that may be performed by network device, such as a base station, according to some aspects of the disclosure.
FIG. 6 is a flow chart of a method of wireless communication that may be performed by a UE according to some aspects of the disclosure.

Group-based DPM signaling in accordance with one or more aspects of FIGS. 4 and 5 may reduce power consumption in a wireless communication system 300. For example, between frame bursts associated with the application 310, one or more of the UEs 301-304 may operate according to a low power state. Alternatively or in addition, the base station 105 may operate according to a low power state between frame bursts associated with the application 310. Further, signaling overhead may be reduced by assigning multiple UEs to a common DPM group (e.g., the first group 351 or the second group 352) that receives a common DPM signal (e.g., the message 360), thus reducing power consumption and network traffic within the wireless communication system 300.

Although the base station 105 has been described in some examples as a single device or entity, it is noted that operations of the base station 105 may be performed by multiple devices or entities in some implementations. To illustrate, in some examples of an open radio access network (ORAN) implementation, operations of the base station 105 may be performed using a radio unit (RU) device, a distributed unit (DU) device, and a centralized unit (CU) device. In some implementations, the RU device may transmit wireless communication signals to and receive wireless communication signals from the UE 115, and one or more of the DU device or the CU device may perform other operations, such as communications with a core network. A communication link between the RU device and the DU device may be referred to as a fronthaul communication link. A communication link between the DU device the CU device may be referred to as a midhaul communication link. A communication link between the CU device and the core network may be referred to as a backhaul communication link. Those of skill in the art will appreciate that other examples of an ORAN or other implementation are also within the scope of the disclosure.

FIG. 5 is a flow chart of a method 500 of wireless communication that may be performed by network device (such as a base station) according to some aspects of the disclosure. In some examples, the method 500 is performed by the base station 105.

The method 500 includes receiving, by a network device from a server, first data associated with an application, at 502. As an illustrative example, the base station 105 may receive any of the data 391-392 from the XR server 390.

The method 500 further includes, during a first monitoring occasion associated with the application, transmitting, by the network device, the first data to a first group of multiple UE devices that execute the application, at 504. As an illustrative example, the base station 105 may transmit any of the data 391-392 to the UEs 301-302 of the first group 351 during the monitoring occasion 326a, such as illustrated in the example of FIG. 4.

The method 500 further includes transmitting a message to the first group after transmitting the first data, at 506. The message indicates completion of the first monitoring occasion. For example, after transmitting the data 391-392, the base station 105 may transmit the message 360 to the UEs 301-302 of the first group 351 to indicate completion of the monitoring occasion 326a.

The method 500 may further include, during a second monitoring occasion associated with the application, transmitting, by the network device, second data associated with the application to a second group of multiple UE devices that execute the application, at 508, and after transmitting the second data, transmitting, by the network device, the message to the second group to indicate completion of the second monitoring occasion, at 510. As an illustrative example, the second data may correspond to any of the data 393-394, and the base station 105 may transmit the data 393-394 to the UEs 303-304 of the second group 352 during the monitoring occasion 336a. After transmitting the data 393-394, the base station 105 may transmit the message 360 to the UEs 303-304 of the second group 352 to indicate completion of the monitoring occasion 336a.

FIG. 6 is a flow chart of a method 600 of wireless communication that may be performed by a UE according to some aspects of the disclosure. In some examples, the method 600 is performed by any of the UEs 115, 301, 302, 303, and 304.

The method 600 includes executing an application by a UE, at 602. For example, any of the UEs 115, 301, 302, 303, and 304 may execute the application 310.

The method 600 further includes, during a first monitoring occasion associated with the application and during operation by the UE based on a first mode, receiving first data associated with the application from a network device, at 604. As an illustrative example, the UE 301 may receive the data 391 during the monitoring occasion 326a during operation based on the first mode (e.g., based on a first power consumption).

The method 600 further includes receiving a message by the UE from the network device, at 606. The message indicates completion of the first monitoring occasion. As an illustrative example, the UE 301 may receive the message 360 from the base station 105 indicating completion of the monitoring occasion 326a.

The method 600 further includes transitioning, based on the message, from operation based on the first mode to a second mode, at 608. For example, the UE 301 may transition, based on the message 360, from the first mode to the second mode (e.g., based on a second power consumption less than the first power consumption).

The method 600 further includes transitioning, based on a second monitoring occasion associated with the application, from operation based on the second mode to the first mode to receive second data associated with the application from the network device, at 610. For example, the UE 301 may transition from the second mode to the first mode to receive data during the monitoring occasion 326b, such as illustrated in the example of FIG. 4. In some examples, the first data includes a first plurality of frames received during a first frame burst associated with the application 310, and the second data includes a second plurality of frames received during a second frame burst associated with the application 310.

Figure 7:
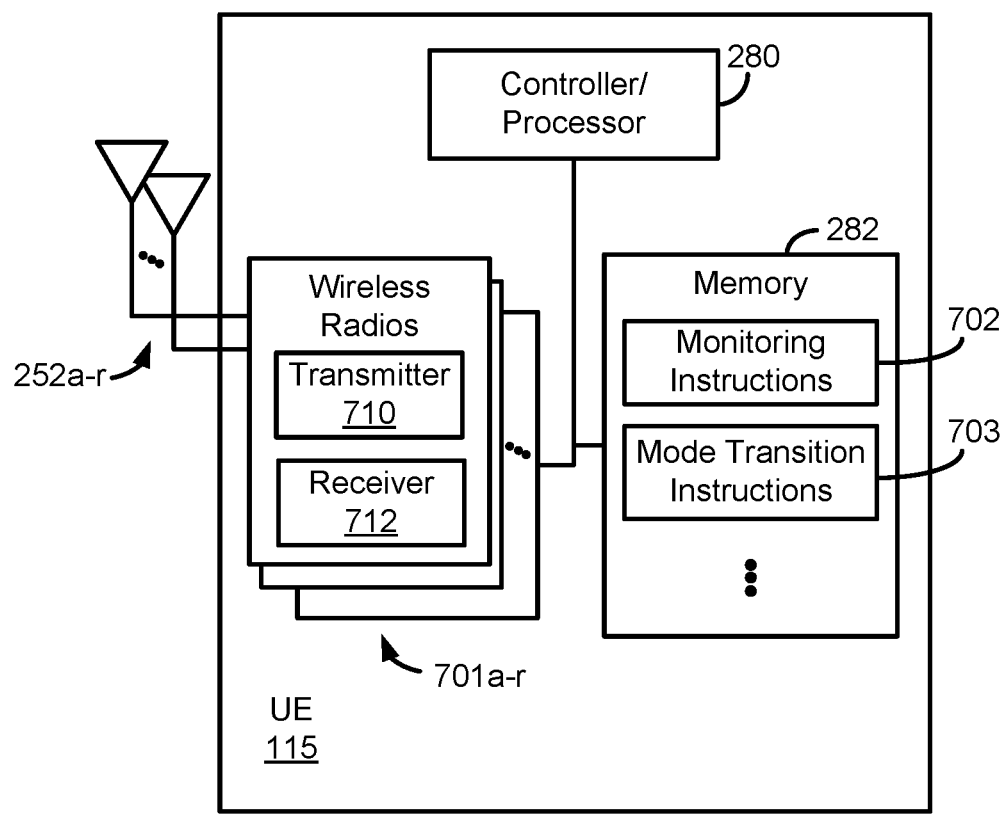
FIG. 7 is a block diagram illustrating an example of a UE according to some aspects of the disclosure.

FIG. 7 is a block diagram illustrating an example of a UE 115 according to some aspects of the disclosure. The UE 115 may include structure, hardware, or components illustrated in FIG. 2. For example, the UE 115 may include the controller/processor 280, which may execute instructions stored in the memory 282. Using the controller/processor 280, the UE 115 may transmit and receive signals via wireless radios 701a-r and antennas 252a-r. The wireless radios 701a-r may include one or more components or devices described herein, such as the modulator/demodulators 254a-r, the MIMO detector 256, the receive processor 258, the transmit processor 264, the TX MIMO processor 266, one or more other components or devices, or a combination thereof.

In some examples, one or more of the wireless radios 701a-r include or correspond to a transmitter 710 and a receiver 712. The transmitter 710 and the receiver 712 may be configured to communicate one or more signals described herein. For example, the receiver 712 may be configured to receive any of the data 391-392 during the monitoring occasion 326a, such as illustrated in the example of FIG. 4. As another example, the receiver 712 may be configured to receive the message 360 to detect completion of the monitoring occasion 326a.

In some examples, the controller/processor 280 executes monitoring instructions 702 to monitor for or receive data from the base station 105, such as any of the data 391-394, other data, or a combination thereof. The controller/processor 280 may execute the monitoring instructions 702 to selectively monitor for or receive data during monitoring occasions specified by the base station 105 (e.g., the monitoring occasion 326a) without monitoring for data outside the monitoring occasions. The controller/processor 280 may execute mode transition instructions 703 to transition, based on the message 360, from operation based on a first mode to a second mode and for transitioning, based on a monitoring occasion (e.g., the monitoring occasion 326b), from operation based on the second mode to the first mode to receive second data associated with the application 310 from the base station 105. In some other examples, operations described with reference to the mode transition instructions may be implemented using a hardware device, such as a control register that stores a flag indicating whether the message 360 has been received for a particular monitoring occasion to indicate completion of the monitoring occasion.

Figure 8:
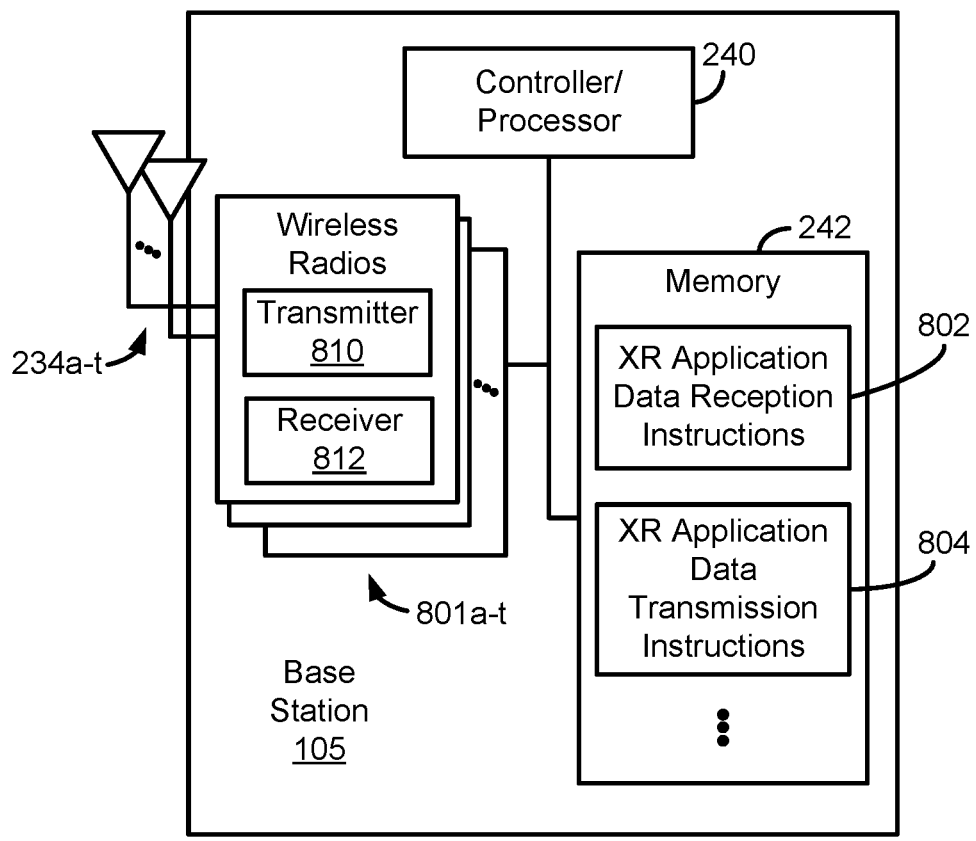
FIG. 8 is a block diagram illustrating an example of a base station according to some aspects of the disclosure.

FIG. 8 is a block diagram illustrating an example of a base station according to some aspects of the disclosure. The base station 105 may include structure, hardware, and components illustrated in FIG. 2. For example, the base station 105 may include the controller/processor 240, which may execute instructions stored in memory 242. Under control of the controller/processor 240, the base station 105 may transmit and receive signals via wireless radios 801a-t and antennas 234a-t. The wireless radios 801a-t may include one or more components or devices described herein, such as the modulator/demodulators 232a-t, the MIMO detector 236, the receive processor 238, the transmit processor 220, the TX MIMO processor 230, one or more other components or devices, or a combination thereof.

In some examples, one or more of the wireless radios 801a-t include or correspond to a transmitter 810 and a receiver 812. The transmitter 810 and the receiver 812 may be configured to communicate one or more signals described herein. For example, the transmitter 810 may be configured to transmit any of the data 391-392 to the UEs 301-302 of the first group 351 during the monitoring occasion 326a, such as illustrated in the example of FIG. 4. As another example, the transmitter 810 may be configured to transmit the message 360 to indicate completion of the monitoring occasion 326a.

In some examples, the controller/processor 240 executes XR application data reception instructions 802 to receive data from the XR server 390, such as the data 391-394. The controller/processor 240 may also execute XR application data transmission instructions 804 to transmit, during a first monitoring occasion (e.g., the monitoring occasion 326a or the monitoring occasion 336a) associated with the application 310, the data to a group of UEs that execute the application 310 (e.g., the first group 351 or the second group 352) and for transmitting the message 360 to the group to indicate completion of the first monitoring occasion.

According to some further examples, in a first example, a method of wireless communication includes receiving, by a network device from a server, first data associated with an application. The method further includes, during a first monitoring occasion associated with the application, transmitting, by the network device, the first data to a first group of multiple UE devices that execute the application. The method further includes, after transmitting the first data, transmitting, by the network device to the first group, a message indicating completion of the first monitoring occasion.

In a second example alternatively or in addition to the first example, the method further includes, during a second monitoring occasion associated with the application, transmitting, by the network device, second data associated with the application to a second group of multiple UE devices that execute the application, and after transmitting the second data, transmitting, by the network device, the message to the second group to indicate completion of the second monitoring occasion.

In a third example alternatively or in addition to any of the first through second examples, the method further includes identifying the first group based on a difference between traffic offsets associated with the first group being less than a threshold time interval.

In a fourth example alternatively or in addition to any of the first through third examples, the method further includes adjusting a traffic offset associated with at least one UE of the first group to be within monitoring occasions associated with the first group.

In a fifth example alternatively or in addition to any of the first through fourth examples, the method further includes identifying the first group based on the first group being within a threshold physical distance of one another such that the network device is enabled to use a common beam direction for the first group.

In a sixth example alternatively or in addition to any of the first through fifth examples, the method further includes, after selection of the first group based on the threshold physical distance, adjusting a traffic offset associated with at least one UE of the first group to be within monitoring occasions associated with the first group.

In a seventh example alternatively or in addition to any of the first through sixth examples, the method further includes transmitting an indication of the adjusted traffic offset to the server.

In an eighth example alternatively or in addition to any of the first through seventh examples, at least one UE of the first group operates based on a first mode associated with a first power consumption during the first monitoring occasion, the at least one UE operates based on a second mode associated with a second power consumption after the first monitoring occasion and prior to a second monitoring occasion, and the second power consumption is less than the first power consumption.

In a ninth example alternatively or in addition to any of the first through eighth examples, the network device operates based on a first mode associated with a first power consumption during the first monitoring occasion, the network device operates based on a second mode associated with a second power consumption after the first monitoring occasion and prior to a second monitoring occasion, and the second power consumption is less than the first power consumption.

In a tenth example alternatively or in addition to any of the first through ninth examples, the method further includes selecting the first monitoring occasion based on one or more control signals transmitted by the network device.

In an eleventh example alternatively or in addition to any of the first through tenth examples, the one or more control signals include a synchronization signal block (SSB), a channel state information reference signal (CSI-RS), a tracking reference signal (TRS), or another signal transmitted periodically or semi-statically by the network device.

In a twelfth example alternatively or in addition to any of the first through tenth examples, transmission of at least a portion of the one or more control signals occurs during the first monitoring occasion.

In a thirteenth example alternatively or in addition to any of the first through twelfth examples, the method further includes selecting the first monitoring occasion to avoid overlap of transmission of the one or more control signals with the first monitoring occasion.

In a fourteenth example alternatively or in addition to any of the first through thirteenth examples, the application includes or corresponds to an extended reality (XR) program.

In a fifteenth example alternatively or in addition to any of the first through fourteenth examples, a non-transitory computer-readable medium stores instructions executable by a processor to perform operations. The operations include receiving, by a network device from a server, first data associated with an application. The operations further include, during a first monitoring occasion associated with the application, transmitting, by the network device, the first data to a first group of multiple UE devices that execute the application. The operations further include, after transmitting the first data, transmitting, by the network device to the first group, a message indicating completion of the first monitoring occasion.

In a sixteenth example alternatively or in addition to any of the first through fifteenth examples, an apparatus includes a memory and one or more processors coupled to the memory. The one or more processors are configured to receive, from a server, first data associated with an application, and during a first monitoring occasion associated with the application, to transmit the first data to a first group of multiple UE devices that execute the application. The one or more processors are further configured to transmit a message to the first group after transmitting the first data. The message indicates completion of the first monitoring occasion.

In a seventeenth example alternatively or in addition to any of the first through sixteenth examples, an apparatus includes means for receiving, from a server, first data associated with an application. The apparatus further includes means for transmitting, during a first monitoring occasion associated with the application, the first data to a first group of multiple UE devices that execute the application and for transmitting a message to the first group after transmitting the first data. The message indicates completion of the first monitoring occasion.

In an eighteenth example alternatively or in addition to any of the first through seventeenth examples, a method of wireless communication includes executing an application by a UE. The method further includes, during a first monitoring occasion associated with the application and during operation by the UE based on a first mode, receiving first data associated with the application from a network device. The method further includes receiving, by the UE from the network device, a message indicating completion of the first monitoring occasion. The method further includes, based on the message, transitioning, by the UE, from operation based on the first mode to a second mode, and based on a second monitoring occasion associated with the application, transitioning from operation based on the second mode to the first mode to receive second data associated with the application from the network device.

In a nineteenth example alternatively or in addition to any of the first through eighteenth examples, the UE is included in a plurality of UEs that execute the application, and the message is addressed to the plurality of UEs.

In a twentieth example alternatively or in addition to any of the first through nineteenth examples, the plurality of UEs are selected based on a difference between traffic offsets associated with the plurality of UEs being less than a threshold time interval.

In a twenty-first example alternatively or in addition to any of the first through twentieth examples, a traffic offset associated with at least one UE of the plurality of UEs is adjusted to be within the monitoring occasions associated with the plurality of UEs.

In a twenty-second example alternatively or in addition to any of the first through twenty-first examples, the plurality of UEs are selected based on the plurality of UEs being within a threshold physical distance of one another to enable a common beam direction from the network device to the plurality of UEs.

In a twenty-third example alternatively or in addition to any of the first through twenty-second examples, after selection of the plurality of UEs based on the threshold physical distance, a traffic offset associated with at least one UE of the plurality of UEs is adjusted to be within monitoring occasions associated with the plurality of UEs.

In a twenty-fourth example alternatively or in addition to any of the first through twenty-third examples, the application includes or corresponds to an extended reality (XR) program.

In a twenty-fifth example alternatively or in addition to any of the first through twenty-fourth examples, the first data includes a first plurality of frames received during a first frame burst associated with the application, and the second data includes a second plurality of frames received during a second frame burst associated with the application.

In a twenty-sixth example alternatively or in addition to any of the first through twenty-fifth examples, the method further includes determining, by the UE, a start time of the second monitoring occasion based on a frame periodicity associated with the application, and the UE transitions from the second mode to the first mode based on the start time of the second monitoring occasion.

In a twenty-seventh example alternatively or in addition to any of the first through twenty-sixth examples, the first mode is associated with a first power consumption, and the second mode is associated with a second power consumption that is less than the first power consumption.

In a twenty-eighth example alternatively or in addition to any of the first through twenty-seventh examples, a non-transitory computer-readable medium stores instructions executable by a processor to perform operations. The operations include executing an application by a UE, and during a first monitoring occasion associated with the application and during operation by the UE based on a first mode, receiving first data associated with the application from a network device. The operations further include receiving, by the UE from the network device, a message indicating completion of the first monitoring occasion. The operations further include, transitioning, based on the message by the UE, from operation based on the first mode to a second mode, and based on a second monitoring occasion associated with the application, transitioning from operation based on the second mode to the first mode to receive second data associated with the application from the network device.

In a twenty-ninth example alternatively or in addition to any of the first through twenty-eighth examples, an apparatus includes a memory and one or more processors coupled to the memory. The one or more processors are configured to execute an application and, during a first monitoring occasion associated with the application and during operation based on a first mode, to receive first data associated with the application from a network device. The one or more processors are further configured to receive, from the network device, a message indicating completion of the first monitoring occasion, and based on the message, to transition from operation based on the first mode to a second mode. The one or more processors are further configured to transition, based on a second monitoring occasion associated with the application, from operation based on the second mode to the first mode to receive second data associated with the application from the network device.

In a thirtieth example alternatively or in addition to any of the first through twenty-ninth examples, an apparatus includes means for executing an application. The apparatus further includes means for receiving, during a first monitoring occasion associated with the application and during operation based on a first mode, first data associated with the application from a network device and for receiving, from the network device, a message indicating completion of the first monitoring occasion. The apparatus further includes means for transitioning, based on the message, from operation based on the first mode to a second mode and for transitioning, based on a second monitoring occasion associated with the application, from operation based on the second mode to the first mode to receive second data associated with the application from the network device.

In a thirty-first aspect alternatively or in addition to one or more of the first through thirtieth aspects, an apparatus for wireless communication includes a transmitter and a receiver. The receiver is configured to receive, during a first monitoring occasion associated with an application and during operation based on a first mode, first data associated with the application from a network device. The receiver is further configured to receive, from the network device, a message indicating completion of the first monitoring occasion. The message is associated with a first transition from operation based on the first mode to a second mode. The receiver is further configured to receive, based on a second monitoring occasion associated with the application and after a second transition from operation based on the second mode to the first mode, second data associated with the application from the network device.

In a thirty-second aspect alternatively or in addition to one or more of the first through thirty-first aspects, the receiver is further configured to receive a first plurality of frames during a first frame burst associated with the application and to receive a second plurality of frames during a second frame burst associated with the application. The first data includes the first plurality of frames, and wherein the second data includes the second plurality of frames.

In a thirty-third aspect alternatively or in addition to one or more of the first through thirty-second aspects, a start time of the second monitoring occasion is based on a frame periodicity associated with the application, and the second transition from the second mode to the first mode is based on the start time of the second monitoring occasion.

In a thirty-fourth aspect alternatively or in addition to one or more of the first through thirty-third aspects, the first mode is associated with a first power consumption, and the second mode is associated with a second power consumption that is less than the first power consumption.

In a thirty-fifth aspect alternatively or in addition to one or more of the first through thirty-fourth aspects, the apparatus is included in a plurality of UEs that execute the application, and wherein the message is addressed to the plurality of UEs.

In a thirty-sixth aspect alternatively or in addition to one or more of the first through thirty-fifth aspects, the plurality of UEs are selected based on a difference between traffic offsets associated with the plurality of UEs being less than a threshold time interval.

In a thirty-seventh aspect alternatively or in addition to one or more of the first through thirty-sixth aspects, at least one of the traffic offsets is adjusted to be within monitoring occasions associated with the plurality of UEs.

In a thirty-eighth aspect alternatively or in addition to one or more of the first through thirty-seventh aspects, the plurality of UEs are selected based on the plurality of UEs being within a threshold physical distance of one another to enable a common beam direction from the network device to the plurality of UEs.

In a thirty-ninth aspect alternatively or in addition to one or more of the first through thirty-eighth aspects, after selection of the plurality of UEs based on the threshold physical distance, a traffic offset associated with at least one UE of the plurality of UEs is adjusted to be within monitoring occasions associated with the plurality of UEs.

In a fortieth aspect alternatively or in addition to one or more of the first through thirty-ninth aspects, an apparatus for wireless communication includes a transmitter and a receiver. The transmitter is configured to transmit, during a first monitoring occasion associated with an application, first data associated with the application to a first group of multiple user equipment (UE) devices that execute the application. The first data is received from a server associated with the application. The transmitter is further configured to transmit, to the first group after transmitting the first data, a message indicating completion of the first monitoring occasion.

In a forty-first aspect alternatively or in addition to one or more of the first through fortieth aspects, the transmitter is further configured to transmit, during a second monitoring occasion associated with the application, second data associated with the application to a second group of multiple UE devices that execute the application. The transmitter is further configured to transmit, after transmitting the second data, the message to the second group to indicate completion of the second monitoring occasion.

In a forty-second aspect alternatively or in addition to one or more of the first through forty-first aspects, the application includes or corresponds to an extended reality (XR) program.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more components, functional blocks, and devices described herein (e.g., one or more components, functional blocks, and devices of FIG. 2) may include one or more processors, electronics devices, hardware devices, electronics components, logical circuits, memories, software codes, firmware codes, etc., or any combination thereof. Those of skill would further appreciate that the various illustrative logical blocks, devices, circuits, and operations (e.g., the operations of FIGS. 5 and 6) described herein may be implemented using electronic hardware, computer software, or combinations of both. To illustrate, various components, blocks, devices, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A user equipment (UE) for wireless communication, the UE comprising:
    a transmitter; and
    a receiver configured to:
        receive, during a first monitoring occasion associated with an application and during an operation according to a first mode, first data associated with the application;
        receive a message indicating completion of the first monitoring occasion, the message being associated with a first transition from the operation according to the first mode to an operation according to a second mode; and receive, according to a second monitoring occasion associated with the application and after a second transition from the operation according to the second mode to the operation according to the first mode, second data associated with the application, the first monitoring occasion and the second monitoring occasion being in accordance with a frame periodicity associated with the application.

2. The UE of claim 1, wherein a start time of the second monitoring occasion is in accordance with the frame periodicity associated with the application, and wherein the second transition from the second mode to the first mode is in accordance with the start time of the second monitoring occasion.

3. The UE of claim 1, wherein the first mode is associated with a first power consumption, and wherein the second mode is associated with a second power consumption that is less than the first power consumption.

4. The UE of claim 1, wherein the message is addressed to a plurality of UEs including the UE.

5. The UE of claim 4, wherein the receiver is further configured to receive the message in accordance with a difference between traffic offsets associated with the plurality of UEs being less than a threshold time interval.

6. The UE of claim 5, wherein at least one of the traffic offsets is adjusted to be within one or more monitoring occasions associated with the plurality of UEs.

7. The UE of claim 4, wherein the receiver is further configured to receive the message in accordance with the plurality of UEs being within a threshold physical distance of one another to enable a common beam direction from a network device to the plurality of UEs.

8. The UE of claim 7, wherein the receiver is further configured to receive the message further in accordance with a traffic offset associated with at least one UE of the plurality of UEs being adjusted to be within one or more monitoring occasions associated with the plurality of UEs.

9. The UE of claim 1, wherein an end time of the first monitoring occasion is separated from a start time of the second monitoring occasion by a time period greater than zero, and wherein a duration of the time period corresponds to the frame periodicity associated with the application.

10. A method of wireless communication at a network device, comprising:
receiving first data associated with an application;
during a first monitoring occasion associated with the application, transmitting the first data to a first group of user equipments (UEs) that execute the application;
after transmitting the first data, transmitting, to the first group, a message indicating completion of the first monitoring occasion; and
during a second monitoring occasion associated with the application, transmit second data associated with the application to a second group of UEs that execute the application, the first monitoring occasion and the second monitoring occasion being in accordance with a frame periodicity associated with the application.

11. The method of claim 10, further comprising identifying the first group in accordance with a difference between traffic offsets associated with the first group being less than a threshold time interval.

12. The method of claim 11, further comprising adjusting a traffic offset associated with at least one UE of the first group to be within one or more monitoring occasions associated with the first group.

13. The method of claim 10, further comprising identifying the first group in accordance with UEs of the first group being within a threshold physical distance of one another such that the network device is enabled to use a common beam direction for communications with the first group.

14. The method of claim 13, further comprising, after the identification of the first group to receive the message in accordance with the threshold physical distance, adjusting a traffic offset associated with at least one UE of the first group to be within one or more monitoring occasions associated with the first group.

15. The method of claim 14, further comprising transmitting an indication of the adjusted traffic offset.

16. The method of claim 10, further comprising operating according to a first mode associated with a first power consumption during the first monitoring occasion, wherein the network device operates according to a second mode associated with a second power consumption after the first monitoring occasion and prior to the second monitoring occasion, and wherein the second power consumption is less than the first power consumption.

17. The method of claim 10, further comprising:
transmitting one or more control signals; and
selecting the first monitoring occasion in accordance with the one or more control signals.

18. The method of claim 17, wherein the one or more control signals include a synchronization signal block (SSB), a channel state information reference signal (CSI-RS), a tracking reference signal (TRS), or another signal transmitted periodically or semi-statically by the network device.

19. The method of claim 17, wherein the transmission of at least a portion of the one or more control signals occurs during the first monitoring occasion.

20. The method of claim 17, further comprising selecting the first monitoring occasion to avoid overlap of transmission of the one or more control signals with the first monitoring occasion.

21. A network device, the network device comprising:
a receiver; and
a transmitter configured to:
transmit, during a first monitoring occasion associated with an application, first data associated with the application to a first group of user equipments (UEs) that execute the application;
transmit, to the first group after transmitting the first data, a message indicating completion of the first monitoring occasion; and
during a second monitoring occasion associated with the application, transmit second data associated with the application to a second group of UEs that execute the application, the first monitoring occasion and the second monitoring occasion being in accordance with a frame periodicity associated with the application.

22. The network device of claim 21, wherein the transmitter is further configured to:
after transmitting the second data, transmit the message to the second group to indicate completion of the second monitoring occasion.

23. The network device of claim 21, wherein the application includes or corresponds to an extended reality (XR) program.

24. A method of wireless communication at a user equipment (UE), the method comprising:
- during a first monitoring occasion associated with an application and during an operation according to a first mode, receiving first data associated with the application;
- receiving, by the UE, a message indicating completion of the first monitoring occasion;
- in accordance with the message, transitioning, by the UE, from the operation according to the first mode to an operation according to a second mode; and
- in accordance with a second monitoring occasion associated with the application, transitioning from the operation according to the second mode to the operation according to the first mode to receive second data associated with the application, the first monitoring occasion and the second monitoring occasion being in accordance with a frame periodicity associated with the application.

25. The method of claim 24, and wherein the message is addressed to a plurality of UEs including the UE.

26. The method of claim 25, wherein the message is received in accordance with a difference between traffic offsets associated with the plurality of UEs being less than a threshold time interval.

27. The method of claim 26, wherein the message is received further in accordance with a traffic offset associated with at least one UE of the plurality of UEs being adjusted to be within one or more monitoring occasions associated with the plurality of UEs.

28. The method of claim 25, wherein the message is received in accordance with the plurality of UEs being within a threshold physical distance of one another to enable a common beam direction from a network device to the plurality of UEs.

29. The method of claim 28, wherein a traffic offset associated with at least one UE of the plurality of UEs is adjusted to be within one or more monitoring occasions associated with the plurality of UEs.

* * * * *